July 9, 1957     C. J. WHEELER     2,798,288
APPARATUS FOR SEVERING CAST IRON PIPE AND THE LIKE
Filed Nov. 9, 1956

INVENTOR
CHARLES J. WHEELER
BY *C. T. Cross*
ATTORNEY

United States Patent Office 2,798,288
Patented July 9, 1957

2,798,288

APPARATUS FOR SEVERING CAST IRON PIPE AND THE LIKE

Charles J. Wheeler, Ashtabula, Ohio

Application November 9, 1956, Serial No. 621,409

10 Claims. (Cl. 30—100)

This invention relates to the cutting of hollow articles, and more particularly relates to new and improved readily adjustable apparatus for cutting cylindrical or tubular articles.

This is a continuation-in-part of my application Ser. No. 578,208, filed April 16, 1956.

Up to the present time, the cutting of hollow articles, especially cylindrical or tubular articles such as various types of conduits or pipes, notably cast iron pipe, frequently has been a difficult and time-consuming operation. Cast iron pipe of varying sizes and wall thicknesses is typical of a hollow article which has heretofore been especially difficult to cut quickly and accurately. For that reason, cast iron pipe is particularly referred to throughout the specification and claims although it is to be understood that the practice of this invention, while especially advantageous in the cutting of cast iron pipe is not limited thereto.

Cutting of cast iron pipe heretofore has generally involved the use of hack saws, cold chisels and/or cutting apparatus rotatable or oscillatable about the pipe to effect cutting thereof. While, in some instances, these prior techniques may be satisfactory, certain difficulties generally characterize each of these procedures which render their use disadvantageous in many applications. The use of metal cutting torches also has been employed but there are limitations, too, in the use of such a technique.

The use of both manually operated and power hack saws, while affording means of cutting pipe accurately, generally is slow and relatively costly since the saw blade life often is relatively short. Moreover, it will be appreciated that, at times, the use of a power hack saw is either impracticable or impossible. Moreover, where pipe installation is being carried out in construction work, serious space limitations occasionally are encountered which render the use of any type saw difficult. The use of chisels in the cutting of pipe frequently leads to relatively inaccurate and slow cutting. In addition, as with the use of saws, space limitations at times also impose restrictions on the use of chisels or other similar cutting devices.

Perhaps one of the most common types of pipe cutter employed up to this time has been one embodying a device adapted to be rotated or oscillated about the pipe during the cutting operation. While such devices offer certain advantages over other prior means of cutting pipe, these rotatable or oscillatable cutters have not provided a completely satisfactory solution to the problem of accurately and quickly cutting pipe, especially under conditions where cutting cost and space limitations are additional factors to be considered.

While the invention described and claimed in my above-mentioned application comprises a highly advantageous apparatus and method, and represents a singular advance over the prior art, the present invention represents an improvement thereover which provides a more rapid and simple control and ready adjustment of the compound leverage pressure clamp to facilitate cutting articles of varying sizes.

Accordingly, the principal object of this invention is to avoid the difficulties heretofore encountered and to provide a new and improved method and readily adjustable apparatus for cutting pipe or other hollow articles of varying sizes.

A further object of the invention is the provision of new and improved adjustable apparatus for cutting hollow articles, notably cast iron pipe.

A still further object of the invention is to provide new and hand operable, adjustable apparatus for quickly and accurately cutting pipe.

These and other objects and advantages of the invention will more fully appear from the following description thereof.

Apparatus of this invention adapted to cut a hollow article generally includes at least one cutter having a cutting edge adapted, while substantially stationary with respect to the article, to exert radially-directed, article-cutting pressure and readily adjustable means to apply pressure to said cutting edge. A preferred embodiment contemplates adjustable apparatus which is adapted to provide circumferentially uniform radial article-cutting pressure at a plurality of uniformly spaced points on said articles, i. e., around the circumference of the article where cutting is desired.

A more specifically preferred embodiment of apparatus of this invention utilizes a plurality of cutters connected into a non-extensible linkage adapted to surround the article to be cut and while stationary with respect thereto to apply, via a readily adjustable compound leverage pressure clamp more fully described hereinafter, uniformly circumferentially distributed, radially-directed pressure sufficient to cut the article, e. g., four inch diameter cast iron pipe, without rotation or oscillation of the apparatus about the article.

Briefly, the present invention specifically contemplates cutter apparatus comprising a non-extensible linkage including a plurality of spaced cutters and a readily-adjustable compound leverage pressure clamp having a first jaw secured to one end of the linkage and a second jaw adapted to engage the linkage at a point dictated by the size of the article to be cut, the second jaw comprising two pivotally but adjustably and rigidly secured elements which permit ready and simple adjustment of the jaw spacing to effect cutting of articles of varying sizes.

Referring to the accompanying drawing.

Figure 1:
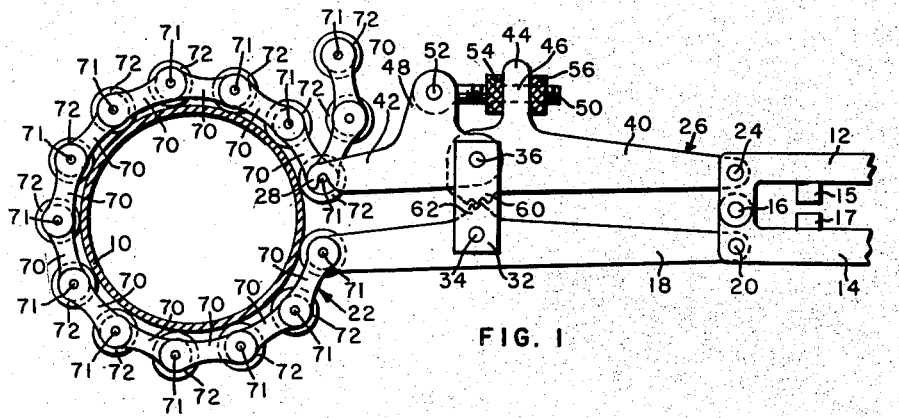
Fig. 1 is a fragmentary view of apparatus of this invention.

Referring more specifically to the drawing, in Fig. 1, there is illustrated apparatus of this invention disposed in position about a pipe 10 to be cut. The apparatus comprises, in combination, a first power lever 12, a second power lever 14 pivotally joined at a first common pivot 16, motion stops 15 and 17, a first clamp jaw 18 pivotally secured at one end to the power lever 14 via a pivotal connection 20 adjacent the first common pivot 16. At its opposite end, the first clamp jaw is pivotally secured to one end of a cutter assembly designated generally at 22 and described in detail hereinafter. Secured at one end to power lever 12 at a pivotal connection 24 is a second clamp jaw indicated generally at 26, and secured at its opposite end to the cutter assembly 22 via a hook 28 engaging pin 71.

The clamp jaws 18 and 26 are pivotally connected by one or two tie plates 32 secured to clamp jaw 18 at pivotal connection 34 via pin 35 and to clamp jaw 26 at pivotal connection 36 via pin 37. Clamp jaws 26 and 18 are provided with meshing saw teeth 60 and 62 to prevent relative longitudinal motion therebetween when pressure is applied to the power levers.

Figure 2:
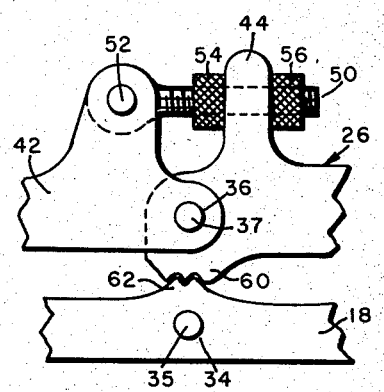
Fig. 2 is an enlarged fragmentary view of a portion of the apparatus of Fig. 1.
Figure 3:
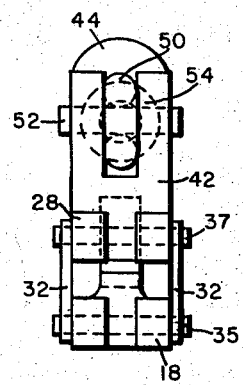
Fig. 3 is an end view of the apparatus shown in Figs. 1 and 2 with the cutter linkage broken away for clarity.

As shown in Figs. 1 and 2, clamp jaw 26 comprises a first rigid element 40 and a second rigid element 42 pivotally joined at 36 via pin 37. Rigid element 40 is provided with a lateral extension 44 having an opening 46 therethrough. Rigid element 42 is provided with a lateral extension 48 bearing a threaded stud 50 or adjusting pin pivotally secured thereto at 52. Threadedly engaging said stud 50 are knurled adjusting and locking nuts 54 and 56.

In operation, nuts 54 and 56, preferably knurled as shown, are loosened and tightened after adjusting the relative positions of rigid elements 40 and 42, thereby adjusting the spacing of clamp jaws 18 and 26 to permit cutting articles of varying sizes. It will be appreciated, thus, that this invention permits rapid and easy hand adjustment of the cutter in use to cut articles of widely varying sizes.

The cutter assembly referred to generally at 22 comprises a plurality of links 70 supporting uniformly-spaced cutters 72 assembled into a non-extensible chain or linkage by pins 71 extending through said cutters and links to permit engagement thereof by the hook 28 of element 42, said assembly adapted when disposed about an article to be cut, e. g., pipe 10, to effect cutting thereof while stationary with respect thereto when tension is applied to said cutter assembly by the clamp jaws 18 and 26.

Considering the operation of the apparatus of this invention, it will be observed that in use for the cutting of cast iron pipe, for example, which is a particularly advantageous application of the present invention, the cutter linkage is disposed about the pipe and secured by hook 28 engaging one of the pins 71, the spacing of the clamp jaws being adjusted by relative movement of elements 40 and 42 about pivot 36, the elements being locked in position by nuts 54 and 56 threadedly engaging stud 50.

Pressure is applied by pressing the power levers together, thus forcing apart the pivots 24 and 20 and thereby pivoting, with greatly increased force, clamp jaws 18 and 26 about pivots 34 and 36 with the result that a high degree of tension is applied to the cutter assembly disposed about the pipe to be cut. This tension transmits a circumferentially-uniform, radially-directed pressure which effects a clean, sharp cutting of the pipe.

The various cutters, clamp jaws and other elements described herein may be formed of suitable metal, alloy, or other high strength material capable of transmitting pressure to the pipe or other article to be cut without cracking, shattering or too rapid dulling. Illustrative of suitable materials are various high strength steels including high carbon steels and low or medium carbon steels. It will be understood, of course, that as a practical matter the particular steel employed in forming the cutters and cutting edges is dicated by a consideration of the hardness, brittleness, availability, etc. The angle included between the surfaces defining a cutting edge generally may be varied also, a typically preferred angle being about 45°.

It is to be understood that although the invention has been described with specific reference to particular embodiments thereof, it is not to be so limited, since changes and alterations therein may be made which are within the full intended scope of this invention as defined by the appended claims.

What is claimed is:

1. An apparatus for cutting a hollow article, said apparatus including at least one cutter having a cutting edge capable of cutting said article while disposed thereabout and stationary with respect thereto via radially-directed pressure, and a compound leverage pressure clamp for applying said pressure, said clamp comprising, in combination, a pair of power levers pivotally joined at a first common pivot, a first clamp jaw pivotally secured at one end to one of said power levers adjacent said first common pivot and at its opposite end to said cutter, an adjustable second clamp jaw comprising, in combination, a first rigid element pivotally secured at one end to the other power arm adjacent said first common pivot and at its opposite end about a second common pivot to a second rigid element having means thereon to engage said cutter, said first and second rigid elements having lateral extensions thereon and means adjustably to lock said first rigid element and said second rigid element into a rigid clamp jaw, a tie plate joining said first and second clamp jaws intermediate their ends and means for preventing longitudinal movement between said clamp jaws during application of pressure thereto by said power handles.

2. Apparatus according to claim 1 wherein said cutter comprises a non-extensible linkage including a plurality of cutting edges.

3. Apparatus according to claim 1 wherein said cutter comprises a non-extensible linkage provided with a plurality of circular cutting edges.

4. Apparatus according to claim 1 where the means to effect locking of said first and second rigid elements comprises a stud secured to one of said lateral extensions and extending through the other extension, said stud having at least one locking member thereon to permit ready alteration of the relative positions of said elements about said second common pivot thereby to adjust the spacing of the clamp jaws.

5. The apparatus according to claim 1 wherein the power levers are joined pivotally through lateral extensions at one end thereof and said clamp jaws originate from the ends of said levers.

6. Apparatus for cutting hollow articles, said apparatus comprising, in combination, a flexible, non-extensible linkage provided with a plurality of spaced, cutting edges capable of cutting said article when disposed thereabout and stationary with respect thereto, and a compound leverage pressure clamp including a pair of power lever handles pivotally joined at one end through a lateral extension at a first common pivot, a first clamp jaw pivotally secured at one end to one of said handles adjacent said first common pivot at the point of origin of said lateral extension and at its opposite end pivotally to one end of said linkage, a second clamp jaw comprising a first rigid element secured at one end to the other handle in the same manner and at its opposite end to a second rigid element through a second common pivot, said second rigid element having means at its free end to engage said linkage at a point dictated by the size of the article to be cut, said first and second rigid elements having lateral extensions thereon and a threaded stud pivotally secured to said extension in said second rigid element and projecting through said extension in said first rigid element, said stud having thereon two adjusting nuts on opposite sides of said extension on said first rigid element, a rigid tie plate pivotally joining through spaced apart pivots said clamp jaws, and meshing saw teeth on said clamp jaws preventing longitudinal relative movemenet between said clamp jaws during application of pressure to said handles.

7. Apparatus according to claim 6 wherein said tie plate is pivotally secured to said second clamp jaw at said second common pivot.

8. Apparatus as in claim 6 wherein said means on said second rigid element to engage said linkage comprises a hook.

9. An apparatus according to claim 1 wherein a plurality of cutters are employed, said cutters being connected into a linkage adapted to surround said article and while stationary to apply substantially uniformly distributed radial pressure sufficient to cut said article without rotation of said apparatus about said article.

10. Apparatus according to claim 1 wherein said cutter includes a curved cutting edge.

No references cited.